(12) United States Patent
Franke et al.

(10) Patent No.: US 7,137,767 B2
(45) Date of Patent: Nov. 21, 2006

(54) STORAGE MEDIA DRIVE ISOLATION APPARATUS AND METHODS

(75) Inventors: Gregory C. Franke, Houston, TX (US); Kenneth B. Frame, Spring, TX (US); Tommy D. Griffin, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 10/807,592

(22) Filed: Mar. 24, 2004

(65) Prior Publication Data
US 2005/0214098 A1 Sep. 29, 2005

(51) Int. Cl.
*F16B 35/06* (2006.01)

(52) U.S. Cl. .................. 411/401; 411/400; 411/546; 411/393; 248/71; 248/224.8; 361/685; 312/334.14; 312/334.7; 312/334.8

(58) Field of Classification Search .............. 248/500, 248/71, 224.8; 411/400, 401, 393; 361/685–687; 312/334.14, 334.7, 334.8; 360/97.02; 441/546
See application file for complete search history.

(56) References Cited

U.S. PATENT DOCUMENTS

| | | | | |
|---|---|---|---|---|
| 4,306,708 | A | * | 12/1981 | Gassaway et al. ....... 267/141.3 |
| 4,683,520 | A | * | 7/1987 | Grassens et al. ............ 361/825 |
| 5,397,206 | A | * | 3/1995 | Sihon .......................... 411/544 |
| 6,122,173 | A | * | 9/2000 | Felcman et al. ............. 361/726 |
| 6,227,784 | B1 | * | 5/2001 | Antoine et al. .............. 411/369 |
| 6,418,011 | B1 | * | 7/2002 | Omori ......................... 361/683 |
| 6,511,038 | B1 | * | 1/2003 | Han ............................. 248/646 |
| 6,813,148 | B1 | * | 11/2004 | Hsu et al. .................... 361/685 |
| 6,917,520 | B1 | * | 7/2005 | Lin et al. ..................... 361/685 |
| 2005/0094367 | A1 | * | 5/2005 | Franke et al. ............... 361/685 |

FOREIGN PATENT DOCUMENTS

JP 02000133959 A * 5/2000

OTHER PUBLICATIONS

Wikipedia, "TORX", date unspecified, downloaded from www.absoluteastronomy.com/encyclopedia/t/to/torx.htm, 2 pages.*

* cited by examiner

*Primary Examiner*—Katherine Mitchell

(57) ABSTRACT

In one embodiment, a fastener includes an integrated isolation member composed of a resilient material, the isolation member being adapted to isolate a storage media drive to which the fastener is to be mounted from a drive cage in which the drive is to be installed, the isolation member being sized and configured to fit within a slot of the drive cage and to abut a surface of the drive cage.

17 Claims, 5 Drawing Sheets

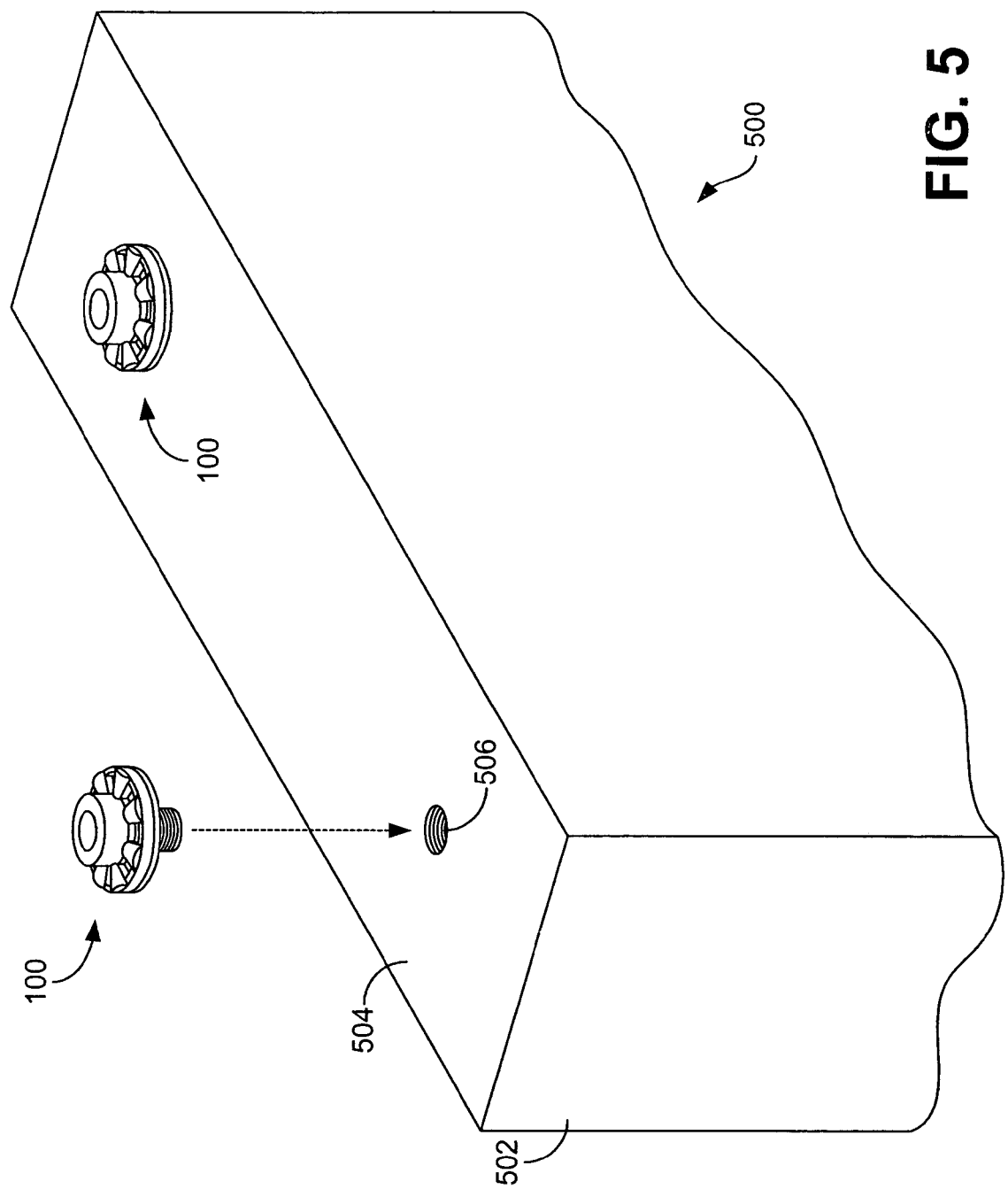

STORAGE MEDIA DRIVE ISOLATION APPARATUS AND METHODS

BACKGROUND

There is currently a drive toward reducing the noise generated by computing devices such as personal computers (PCs). Several components of such computing devices generate noise during operation. For example, fans provided within a computing device to cool the processor create noise. Another source of noise is the vibrations that are transmitted to the device chassis, sometimes referred to as structure-borne noise. For instance, vibrations generated by storage media (e.g., hard disk, optical disc) drives can be transmitted to a drive cage in which the drives are housed and can therefore reverberate throughout the computing device chassis.

In many existing computing devices, storage media drives are mounted within the drive cage such that the exterior housing of each drive directly contacts the drive cage. Given that the drive housing and the drive cage are typically constructed of metal, the direct metal-to-metal contact between the drive and the cage facilitates transmission of the vibrations generated by the drive.

In view of that phenomenon, some computing device manufacturers have incorporated grommets into the drive cage that physically isolate the drives so that direct contact is not made between the drives and the drive cage. Although that solution is effective in reducing transmission of vibrations from the drives to the computing device chassis, it creates other problems. For example, given that the grommets must be mounted within the drive cage (prior to drive installation), fasteners that extend from the drive cage, through the grommets, and into the drives can only be fastened after the drive has been positioned within the cage. Because of that fact, the drives must be installed prior to other computing device construction to ensure that the assembler can access the fasteners to secure them to the drives.

In addition to increasing the difficulty of manufacturing, the above-described isolation solution also increases the difficulty of servicing the computing device. Specifically, because the grommets are mounted to the drive cage, the drives cannot be removed from the cage for servicing or replacement without first removing the fasteners from the drive. Because those fasteners cannot be accessed from the front of the drive cage, such removal may require substantial disassembly of the computing device, which would otherwise not be necessary if the drives were more conventionally mounted.

SUMMARY

In one embodiment, a fastener includes an integrated isolation member composed of a resilient material, the isolation member being adapted to isolate a storage media drive to which the fastener is to be mounted from a drive cage in which the drive is to be installed, the isolation member being sized and configured to fit within a slot of the drive cage and to abut a surface of the drive cage.

BRIEF DESCRIPTION OF THE DRAWINGS

The disclosed storage media isolation apparatus and methods can be better understood with reference to the following drawings. The components in the drawings are not necessarily to scale.

FIG. 5 is a partial perspective view illustrating an embodiment of mounting the fastener of FIGS. 1 and 2 to a storage media drive.

DETAILED DESCRIPTION

Disclosed are apparatus and methods for isolating a storage media drive. In some embodiments, the system comprises fasteners that are mounted to a storage media drive during a pre-assembly stage of manufacturing. Each fastener comprises an isolation member that, when the drive is mounted within a drive cage of a computing device, physically isolates the drive from the drive cage so that direct contact is not made between the outer housing of the drive and the drive cage such that less of the vibration generated by the drive is transmitted to the cage.

Figure 1:
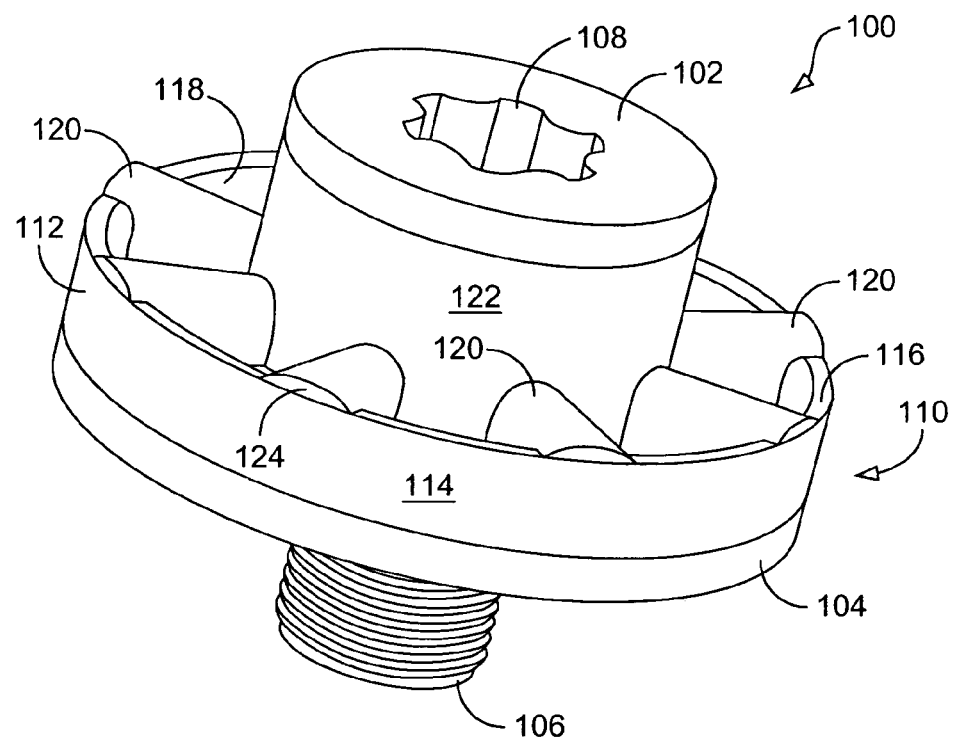
FIG. 1 is a perspective view of an embodiment of a fastener that can be used to secure a storage media drive within a computing device.

Referring now in more detail to the drawings, in which like numerals indicate corresponding parts throughout the several views, FIG. 1 illustrates a fastener 100 that may be used in the disclosed storage media drive isolation system and method. As is indicated in FIG. 1, the fastener 100 includes a head 102, a washer 104, and a threaded stud 106. By way of example, each of those components is made of a strong, rigid material such as a metal (e.g., steel). In some embodiments, the head 102, washer 104, and stud 106 are unitarily formed with each other. However, as is described below, the washer 104 may comprise a separate component that is mounted to a shaft (see FIGS. 3 and 4) of the fastener 100. The head 102 comprises structure, such as an opening 108, that is adapted to receive a fastening tool, such as a screwdriver. In the example of FIG. 1, the opening 108 is configured to receive a "Torx" head screwdriver.

As is further indicated in FIG. 1, the fastener 100 also includes an integrated, resilient isolation member 110. The isolation member 110 is made of a resilient and/or elastomeric material, such as a plastic elastomer. By way of example, the isolation member 110 can be made of Isodamp™ material available from E-A-R Specialty Composites™, 5457 W. 79th Street Indianapolis, Ind. 46268. As is shown in FIG. 1, the isolation member 110 comprises an outer wall 112 that, for example, has an outer diameter that is approximately equal to the outer diameter of the washer 104. The outer wall 112 includes an outer surface 114, a top surface 116, and an inner surface 118. The inner surface 118 of the wall 112 connects with, and optionally is unitarily formed with, a member base 200 (FIG. 2) and ribs 120. The base 200 contacts the washer 104 as well as the outer wall 112 and the ribs 120. The ribs 120 extend from the outer wall 112 radially inward to a generally cylindrical axial portion 122 of the isolation member 110 that surrounds a shaft (see FIGS. 3 and 4) that is connected to the fastener head 102. As is most clearly apparent from FIG. 2, the ribs 120 may taper inwardly as they extend from the outer wall 112 to the axial portion 122.

Returning to FIG. 1, the ribs 120 have a height dimension that is greater than the height dimension of the outer wall 112. Accordingly, a top portion 124 of each rib 120 extends beyond the top surface 116 of the outer wall 112. As is described below, the top portions 124 of the ribs 120 preload the storage media drive when the drive is installed within its drive cage.

Figure 2:
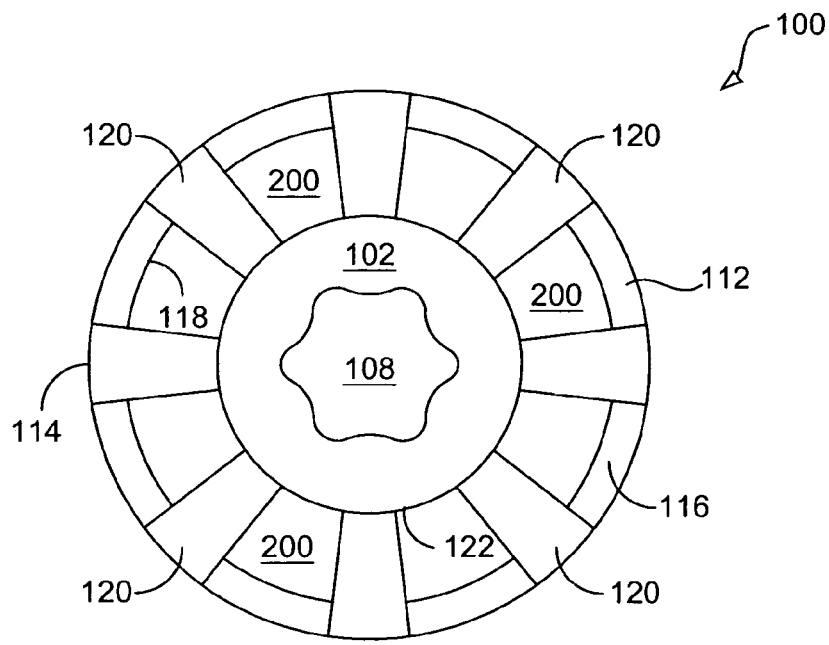
FIG. 2 is a top view of the fastener of FIG. 1.
Figure 3:
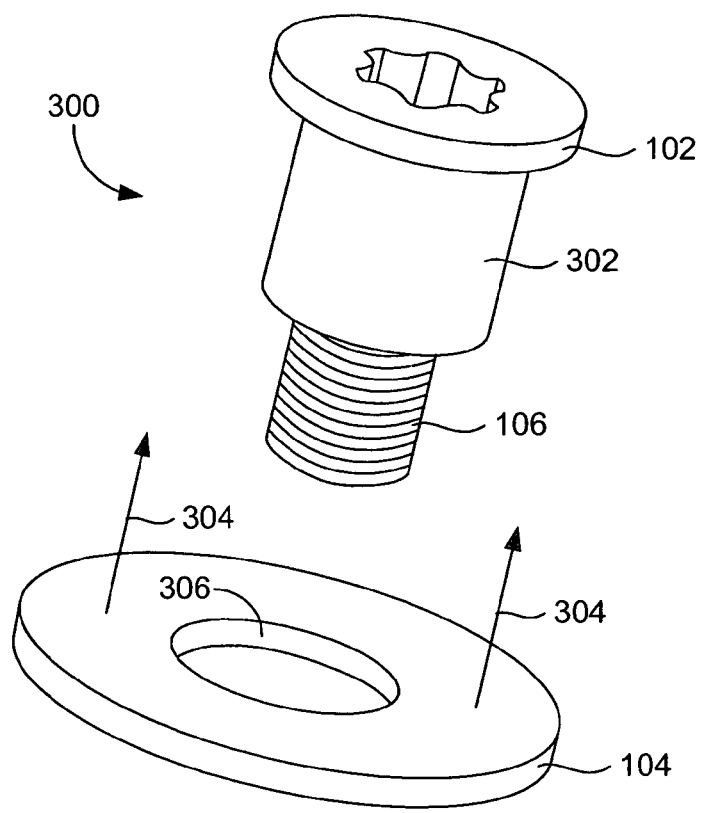
FIG. 3 is a schematic view illustrating an embodiment of providing a washer on a fastener element in fabricating the fastener of FIGS. 1 and 2.
Figure 4:
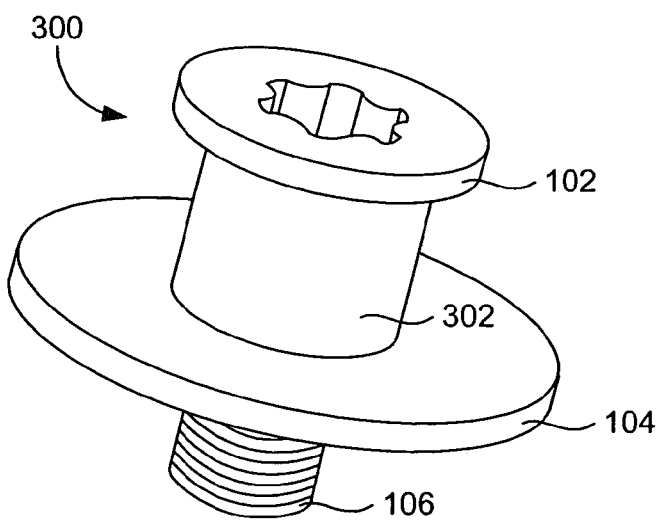
FIG. 4 is a schematic view illustrating the washer mounted to the fastener element shown in FIG. 3.

FIGS. 3 and 4 illustrate part of an example fabrication process for the fastener 100 of FIGS. 1 and 2. Beginning with FIG. 3, a fastener element 300 is provided that includes the head 102 and the threaded stud 106 shown in FIG. 1. Extending between the head 102 and the threaded stud 106 is a shaft 302 that, for example, has a diameter that is smaller that that of the head but larger than that of the threaded stud. The head 102, shaft 302, and threaded stud 106 may be unitarily formed together (e.g., from steel). Also shown in FIG. 3 is the washer 104 from FIG. 1. As mentioned previously, the washer 104 is made of a strong, rigid material such as steel. As is depicted by arrows 304, the washer 104 can be moved toward the fastener element 300 such that an opening 306 of the washer aligns with and may pass over the threaded stud 106. The opening 306 of the washer 104 has a diameter that is slightly smaller than the diameter of the shaft 302 such that, as indicated in FIG. 4, the washer can be securely press-fit onto the shaft to integrate the washer with the fastener element 300.

Once the washer 104 has been attached to the fastener element 300 in the manner described above, the isolation member 110 (FIGS. 1 and 2) can be formed to complete the fastener 100. By way of example, the fastener element 300 with its integrated washer 104 is placed in a mold of an injection molding machine and a thermoplastic elastomer material is injected into the mold to fill a space within the mold that exists between the washer and the head 102 of the fastener 300. Once the injected material cools, the fastener 100 shown in FIGS. 1 and 2 results and the isolation member 110 is integrated with (i.e., forms part of and is not removable from) the remainder of the fastener.

The fastener 100 can be used to mount a storage media drive within a computing device drive cage in a manner in which the outer housing of the drive is isolated from the drive cage to reduce the transmission of vibration from the drive to the cage and, therefore, the remainder of the computing device chassis. During manufacturing of the computing device, one or more fasteners 100 are mounted to the storage media drive in a pre-assembly phase. FIG. 5 illustrates an example of such mounting. As is shown in FIG. 5, a storage media drive 500, such as a magnetic hard drive or an optical (e.g., compact disc (CD)) drive, is provided that comprises an outer housing 502 that includes an end 504 in which threaded openings 506 are provided. The fasteners 100 are threaded into the openings 506 such that the washer 104 of each fastener firmly abuts the end 504. Although the end 504 is illustrated in FIG. 5 as being completely planar, the ends of some drives may be irregularly shaped. For that reason, it can be beneficial for the washer 104 to have a relatively large outer diameter (e.g., approximately ½ inch) to ensure secure positive contact between the washer and the drive end. By way of example, two fasteners 100 are mounted to each of two opposed ends 504 (only one end illustrated in FIG. 5).

Figure 6A:
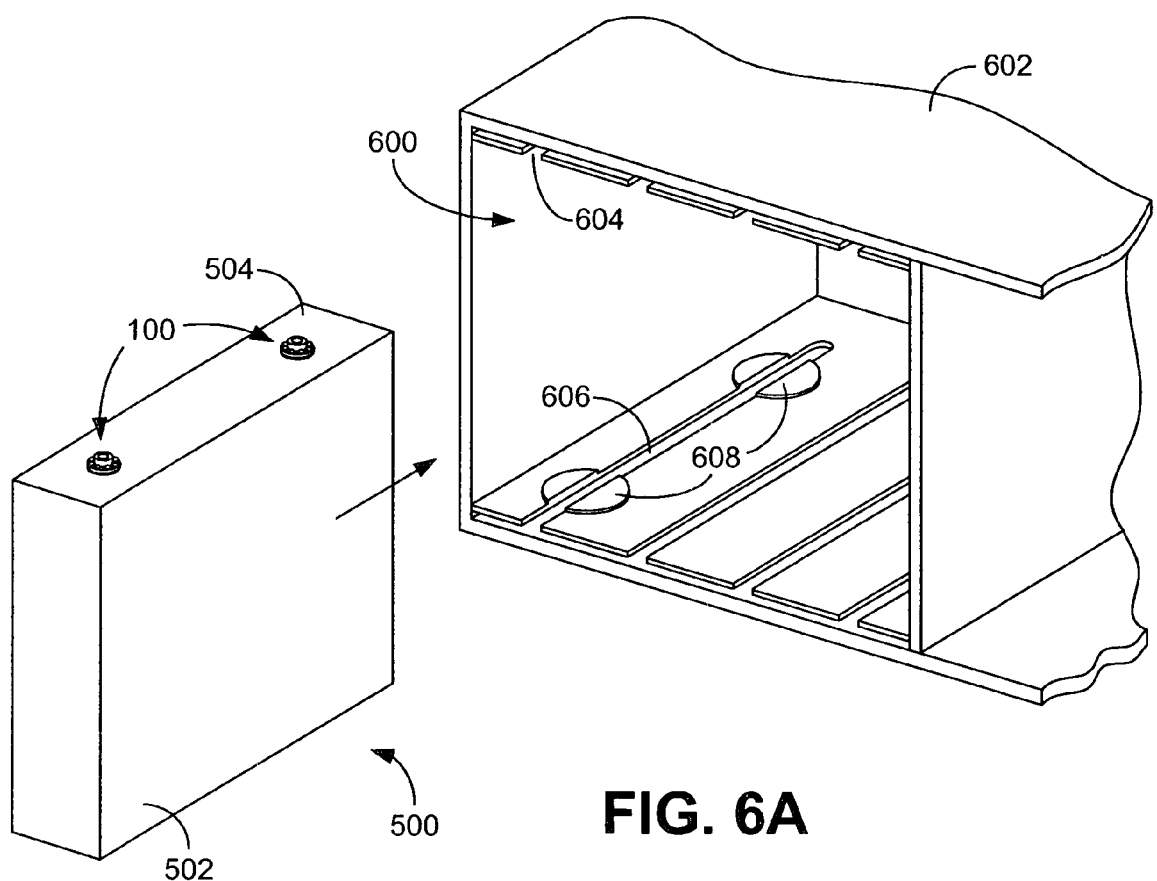
FIG. 6A is a partial perspective view illustrating insertion of the storage media drive of FIG. 5 into a drive cage of a computing device.

Once the fasteners 100 have been mounted to the storage media drive 500, the drive can be inserted into a drive cage (or bay) of a computing device. Such insertion is illustrated in FIG. 6A. As is indicated in that figure, the drive 500 is aligned with a drive cage 600 of a computing device 602 such that the fasteners 100 align with top and bottom (or right and left depending upon the orientation of the computing device) slots (or tracks) 604 and 606 provided within the drive cage. In particular, the drive 500 is aligned relative to the drive cage 600 so that the fasteners 100 can travel along the slots 604 and 606 as the drive is inserted into the cage with the axial portions 122 (FIGS. 1 and 2) of the fasteners fitting between the opposed edges of the slots. With such an arrangement, the fasteners 100 act as guides that guide the drive 500 into place within the drive cage 600. Normally, the outer diameters of the axial portions 122 are larger than the width of the slots 604 and 606 so that positive contact is made between the axial portions and the opposed edges of the slots. That contact aids in securing the drive 500 in place within the drive cage 600.

Figure 6B:
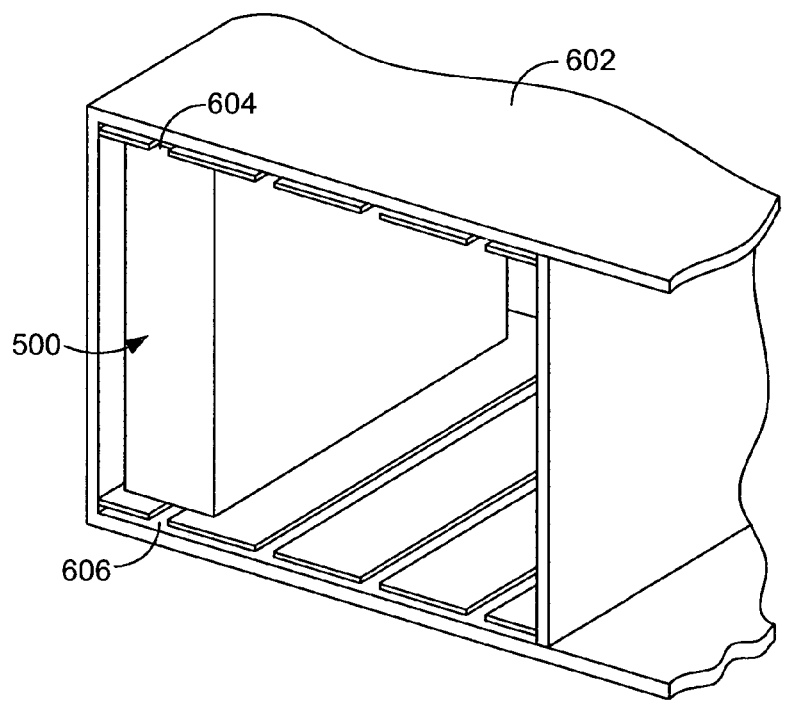
FIG. 6B is a partial perspective view illustrating the storage media drive of FIG. 5 mounted within the drive cage shown in FIG. 6A.

FIG. 6B illustrates the drive 500 fully inserted into the drive cage 600 with the fasteners (not visible in FIG. 6B) positioned within the slots 604 and 606. Optionally, the fasteners 100 may align with and abut raised portions 608 of the drive cage 600 shown in FIG. 6A that are formed along the slots 604 and 606. The raised portions 608, when provided, extend toward the interior of the drive cage 600 and further aid in securing the drive 500 in place by compressing the resilient and/or elastic isolation members 110 (FIGS. 1 and 2) to preload them. Specifically, the ribs 120 and the outer wall 112 of the isolation member 110 are compressed by the drive cage so that the drive is held firmly in place (i.e., due to the outward forces applied by the ribs and outer wall against the cage 600). Due to the configuration of the ribs 120 and the outer wall 112, the isolation member 110 provides a non-linear spring force. Accordingly, the isolation member compresses more easily initially to preload the drive when installed but is more difficult to compress as a function of degree (i.e., dimension) of compression to cushion the drive when impact forces are imposed upon the computing device (e.g., when the device is bumped).

Figure 7:
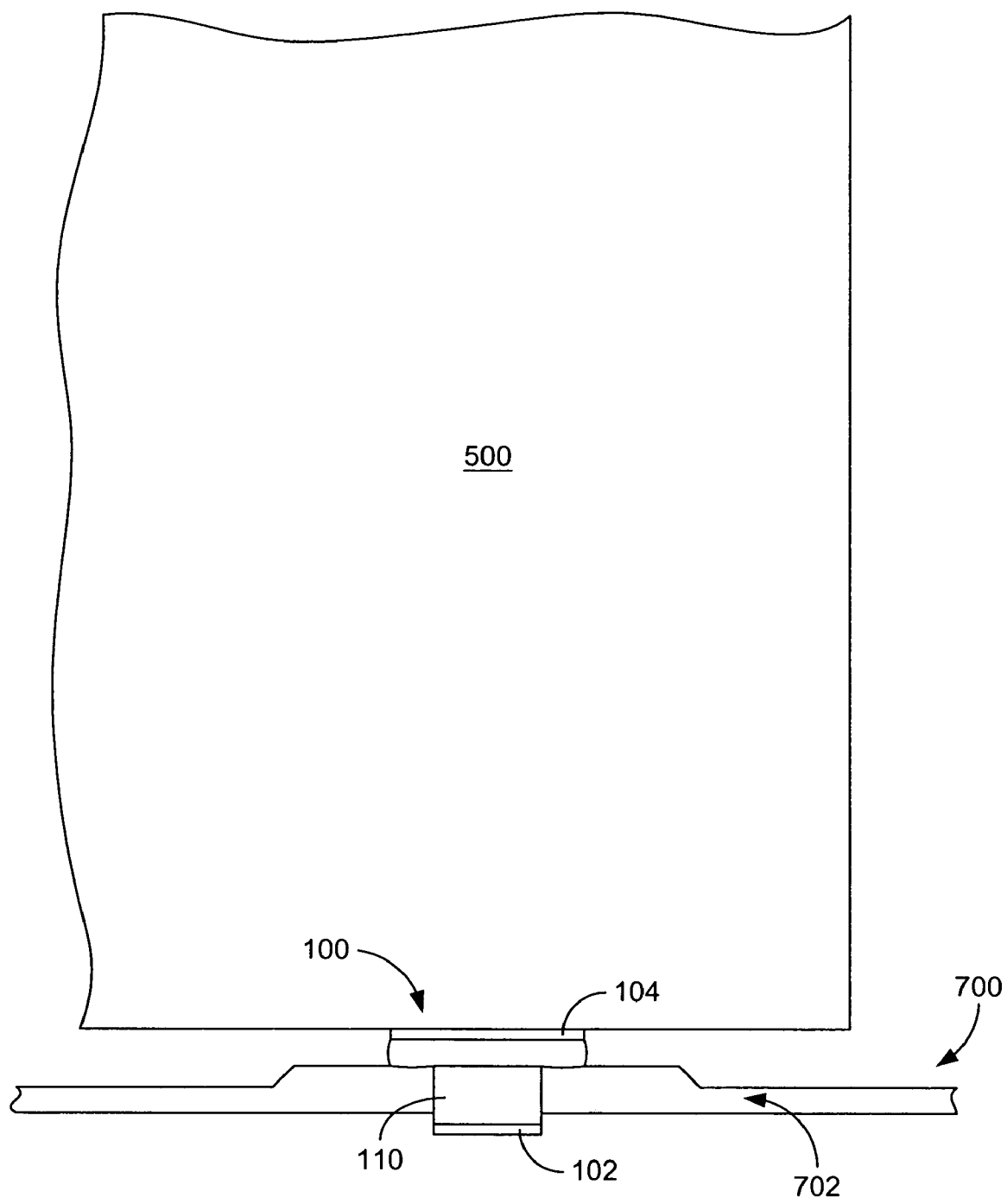
FIG. 7 is a partial perspective view illustrating the fastener of FIGS. 1 and 2 in isolating a storage media drive that is mounted within a drive cage.

FIG. 7 illustrates the interaction between a fastener 100 mounted to the drive 500 and a portion of a drive cage 700. Specifically, illustrated is the fastener 100 positioned within a slot 702 of the drive cage 700. As can be appreciated from FIG. 7, the only part of the fastener 100 that contacts the drive cage 700 is the resilient isolation member 110. Because that member 110 is resilient and/or elastomeric, vibrations generated by the drive 500 are not easily transmitted to the drive cage 700. Specifically, vibrations generated by the drive 500 are dampened by the isolation member 110 to reduce transmission of those vibrations to the drive cage 700 and, therefore, the remainder of the computing device chassis in which the drive is mounted. Accordingly, noise caused by the transmission of vibration from the drive 500 to the chassis is reduced, thereby reducing the overall noise generated by the computing device.

What is claimed is:

1. A fastener for isolating a storage media drive within a drive cage, the fastener comprising:
   a head that is used to tighten the fastener;
   a shaft that extends from the head;
   a washer that contacts the shaft;
   a threaded stud that extends from the shaft beyond the washer; and a resilient isolation member that is provided on the washer between the washer and the head, the isolation member including a base portion having a first diameter and an outer wall that is adapted to abut a surface of the drive cage, and an axial portion that surrounds the shaft and extends from the base portion to the fastener head so as to be positioned between the base portion and the fastener head, the axial portion having a second diameter that is smaller than the first diameter, the axial portion being adapted to fit between opposed edges of a slot formed in the drive cage.

2. The fastener of claim 1, wherein the head, shaft, and threaded stud are unitarily formed with each other.

3. The fastener of claim 2, wherein the head, shaft, and threaded stud are made of a metal material.

4. The fastener of claim 1, wherein the head includes a star-shaped recess.

5. The fastener of claim 1, wherein the washer is press-fit onto the shaft.

6. The fastener of claim 1, wherein the axial portion of the isolation member has a diameter that is approximately the same as an outer diameter of the head.

7. The fastener of claim 1, further comprising ribs that extend radially outward from the axial portion to the outer wall.

8. The fastener of claim 7, wherein the ribs have a height that is greater than a height of the outer wall so as to define top portions that extend beyond a top surface of the outer wall.

9. The fastener of claim 1, wherein the isolation member is made of a thermoplastic elastomer.

10. The fastener of claim 1, wherein the isolation member is injection molded to the washer, shaft, and head.

11. A storage media drive, comprising:
an outer housing that defines ends of the drive; and
fasteners that are mounted to the ends of the drive, the fasteners each comprising an integrated isolation member composed of a resilient material, the isolation member being adapted to isolate the drive from a drive cage in which the drive is to be installed, the isolation member being sized and configured to fit within a slot of the drive cage and to abut a surface of the drive cage;
wherein the isolation member includes a base portion having an outer wall and an axial portion extending from the base portion, the outer wall being adapted to abut the drive cage surface and the axial portion being configured to fit within the drive cage slot, wherein the base portion has a diameter that is larger than a diameter of the axial portion.

12. The drive of claim 11, wherein the isolation member further includes ribs that extend from the axial portion to the outer wall.

13. The drive of claim 11, further comprising openings formed in the ends, wherein the fasteners are threaded into the openings with threaded studs.

14. The drive of claim 11, wherein the fasteners further include a washer upon which the isolation member is provided.

15. The drive of claim 11, wherein the fasteners further include a shaft that extends between the head and the threaded stud.

16. The drive of claim 11, wherein the drive is a magnetic hard drive.

17. The drive of claim 11, wherein the drive is an optical drive.

* * * * *